Aug. 25, 1925.
W. JANSSON
1,550,903
EGG BOILER
Filed Feb. 27, 1924
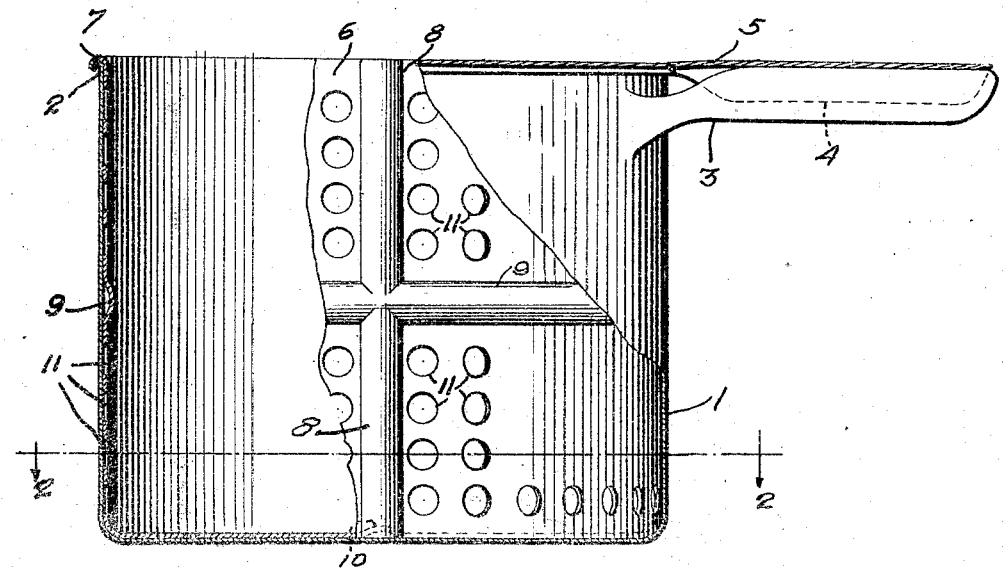
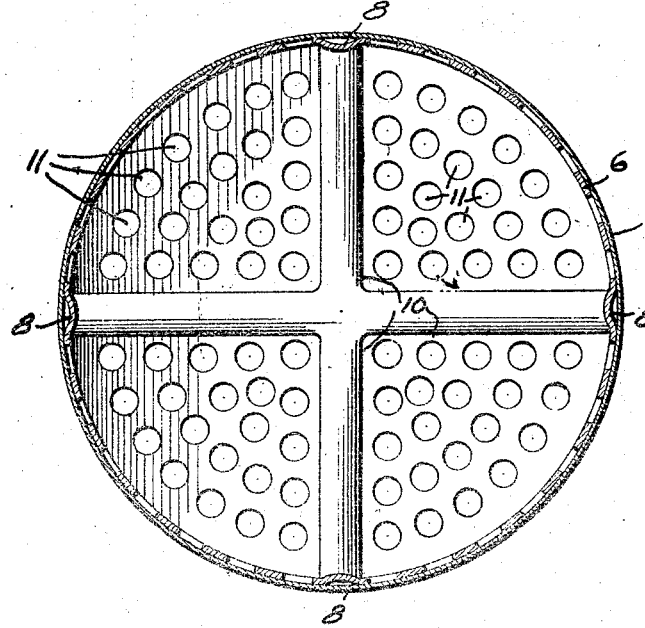
Inventor
Wm Jansson
By
H. J. Sanders
Atty.

Patented Aug. 25, 1925.

1,550,903

UNITED STATES PATENT OFFICE.

WILLIAM JANSSON, OF CHICAGO, ILLINOIS.

EGG BOILER.

Application filed February 27, 1924. Serial No. 695,437.

*To all whom it may concern:*

Be it known that I, WILLIAM JANSSON, a subject of the King of Sweden, residing at Chicago, in the county of Cook and State of Illinois, have invented certain new and useful Improvements in Egg Boilers, of which the following is a specification.

This invention relates to improvements in egg boilers and its chief object is to provide a vessel wherein the eggs may be immersed in the water and removed therefrom without danger of breakage or without the danger of burning the hands of the attendant.

With the foregoing and other objects in view the invention consists in the combination and arrangement of parts to be hereinafter fully described, pointed out in the appended claim and illustrated in the accompanying drawing which forms a part of this application and in which—

Fig. 1 is a sectional view of a boiler constructed in accordance with my present invention.

Fig. 2 is a cross section taken on line 2—2 of Fig. 1.

Like reference characters denote corresponding parts in both views.

The reference numeral 1 denotes an outer vessel or water container preferably circular in cross section and made of a thin sheet of metal so that its contents can be heated readily. The vessel 1 is formed with a downwardly curved rim 2 and with a handle 3 formed with a longitudinal recess or channel 4 adapted to receive and retain the handle 5 of the inner vessel 6 which is also circular in cross section and provided with a downturned rim 7 adapted to seat snugly upon the rim 2.

The vessel 6 is adapted to fit snugly within the vessel 1 and it is formed with the intersecting vertical and horizontal ribs 8, 9. The vertical ribs 8 are preferably spaced 90 degrees apart and merge with the base ribs 10, said ribs serving to strengthen the construction of the vessel and to facilitate its movement into and out of the vessel 1. The vessel 6, by reason of the inwardly struck ribs 8, 9 may be made to snugly fit into the vessel 1 and yet be easily movable relative thereto so that it can be instantly withdrawn from that vessel when the eggs are done and as readily replaced to again receive eggs to be boiled. The vessel 6 is formed, further, with a plurality of circular perforations 11 which admit water from the vessel 1 as said vessels are telescoped one within the other.

The eggs are placed in the vessel 6 before it is introduced into the vessel 1 which contains the water. The vessel 6 is then introduced into the vessel 1 and permitted to remain there until boiled sufficiently when the vessels are again separated and the eggs then permitted to dry and cool when they are removed.

What is claimed is:—

In an egg boiler, an outer vessel circular in cross section and formed with a down turned rim, a handle for said vessel, an inner vessel circular in cross section and adapted to fit snugly in said outer vessel, said inner vessel being perforate and formed with a down turned rim to seat upon the rim of said outer vessel, inwardly struck ribs formed in said inner vessel, and a handle for said inner vessel.

In testimony that I claim the foregoing as my own I have hereto affixed my signature.

WILLIAM JANSSON.